US012467608B1

(12) United States Patent
Xu et al.

(10) Patent No.: US 12,467,608 B1
(45) Date of Patent: Nov. 11, 2025

(54) LED LAMP

(71) Applicant: SHENZHEN SNC OPTO ELECTRONIC CO., LTD., Guangdong (CN)

(72) Inventors: Jianyong Xu, Guangdong (CN); Peng Huang, Guangdong (CN); Renyan Luo, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/957,921

(22) Filed: Nov. 25, 2024

(30) Foreign Application Priority Data

Jul. 4, 2024 (CN) ........................ 202421564035.3

(51) Int. Cl.

| | |
|---|---|
| ***F21V 21/04*** | (2006.01) |
| ***F21S 8/02*** | (2006.01) |
| ***F21V 23/00*** | (2015.01) |
| ***F21V 23/04*** | (2006.01) |
| ***F21V 31/00*** | (2006.01) |
| ***F21Y 115/10*** | (2016.01) |

(52) U.S. Cl.

CPC .............. *F21V 21/04* (2013.01); *F21S 8/026* (2013.01); *F21V 23/003* (2013.01); *F21V 23/04* (2013.01); *F21V 23/0464* (2013.01); *F21V 31/005* (2013.01); *F21Y 2115/10* (2016.08)

(58) Field of Classification Search

CPC .......... F21V 17/06; F21V 17/12; F21V 21/04; F21V 23/0464; F21V 23/04; F21S 8/026

See application file for complete search history.

(56) References Cited

U.S. PATENT DOCUMENTS

| | | | | |
|---|---|---|---|---|
| 2017/0191641 A1* | 7/2017 | Harpenau | ............. | F21V 17/002 |
| 2018/0156423 A1* | 6/2018 | Murby | ..................... | F21S 8/026 |
| 2022/0307659 A1* | 9/2022 | Cohen | ................. | F21V 23/0464 |
| 2023/0258306 A1* | 8/2023 | Smith | ................... | F21V 23/008<br>362/157 |
| 2024/0165285 A1* | 5/2024 | Chen | ......................... | F21K 9/23 |

FOREIGN PATENT DOCUMENTS

CN 119123367 A * 12/2024 ............ F21S 10/023

OTHER PUBLICATIONS

Machine translation of Ouyang, CN 119123367, published Dec. 13, 2024 (Year: 2024).*

* cited by examiner

*Primary Examiner* — William N Harris

(57) ABSTRACT

An LED lamp includes a lamp holder; an LED lamp panel fixed to the lamp holder; a driving power supply fixed to a lamp holder, the driving power supply being electrically connected to the LED lamp panel and configured to supply power to the LED lamp panel; a light-transmitting plate covering the LED lamp panel; a quick mounting and dismounting structure; and a pressing frame pressing the light-transmitting plate and fixed on the lamp holder through the quick mounting and dismounting structure.

8 Claims, 7 Drawing Sheets

LED LAMP

CROSS-REFERENCE TO RELATED APPLICATION

The present application claims priority of Chinese Patent Application No. 2024215640353, filed with the Chinese Patent Office on Jul. 4, 2024, and entitled "LED LAMP", the entire content of which is incorporated herein in its entity

TECHNICAL FIELD

The present disclosure relates to the field of lighting devices, and in particular relates to an LED lamp.

BACKGROUND

LED lamps have many advantages such as energy-saving, environmental protection, long life and so on, and have been widely used in various lighting places. In actual use, a lens plate needs to be replaced to achieve different lighting effects, so as to meet the needs of different scenes. However, in the related art, the following deficiencies exist when replacing the lens plate.

1) Since a LED lamp panel of the LED lamp is electronically connected to a power supply of the LED lamp, an operator may at risk of electric shock d during the replacement of the lens plate.
2) The components of the existing LED lamp are completely fixed before leaving the factory. If the components of the LED lamp need to be replaced, the LED lamp needs to be disassembled in multiple steps, the components fixed with screws need to be disassembled by tools, which is inconvenient and time-consuming for disassembly, and the lens plate is difficult to be replace quickly and conveniently.

SUMMARY

Accordingly, an LED lamp is provided.

An LED lamp includes a lamp holder; an LED lamp panel fixed to the lamp holder; a driving power supply fixed to a lamp holder, the driving power supply being electrically connected to the LED lamp panel and configured to supply power to the LED lamp panel; a light-transmitting plate covering the LED lamp panel; a quick mounting and dismounting structure; and a pressing frame pressing the light-transmitting plate and fixed on the lamp holder through the quick mounting and dismounting structure.

In one of the embodiments, the quick mounting and dismounting structure includes a latching block provided on the pressing frame and a fixing base provided on the lamp holder, the fixing base is provided with a latching groove, the pressing frame is rotatably connected to the lamp holder, when the pressing frame rotates to a first position relative to the lamp holder, the latching block is engaged in the latching groove, when the pressing frame rotates to a second position relative to the lamp holder, the latching block is disengaged from the latching groove.

In one of the embodiments, the LED lamp further includes a switch assembly electrically connected between the LED lamp panel and the driving power supply, the switch assembly is provided on the lamp holder, the light-transmitting plate is located on a side of the LED lamp panel in a light-emitting direction, the light-transmitting plate abuts against the switch assembly when the pressing frame rotates to the first position relative to the lamp holder, and the light-transmitting plate is separated from the switch assembly when the pressing frame rotates to the second position relative to the lamp holder, when the light-transmitting plate is separated from the switch assembly, the switch assembly cuts off an electrical connection between the LED lamp panel and the driving power supply, when the light-transmitting plate abuts against the switch assembly, the switch assembly electrically connects the LED lamp panel and the driving power supply.

In one of the embodiments, the switch assembly includes a switch box, a first electronic switch, and an elastic member, the first electronic switch is fixed in the switch box, two ends of the first electronic switch are electrically connected to the driving power supply and the LED lamp panel, respectively, one side of the elastic member elastically abuts against the light-transmitting plate, and another side of the elastic member faces the first electronic switch and is configured to press a button of the first electronic switch.

In one of the embodiments, the light-transmitting plate is provided with a pressing column corresponding to the elastic member, the switch assembly is located on a side of the LED lamp panel away from the light-transmitting plate, the LED lamp panel is provided with a through hole, and the pressing column extends through the through hole and abuts against the elastic member.

In one of the embodiments, an edge of the light-transmitting plate is provided with a positioning block, the fixing base is provided with a positioning groove corresponding to the positioning block, and the positioning block is engaged in the positioning groove.

In one of the embodiments, the light-transmitting plate has a lens structure.

In one of the embodiments, the LED lamp further includes a light-controlled sensor, a controller, and a controller box, the controller includes a base, a first control switch, a second control switch, and a third control switch that are fixed in the controller box, the first control switch includes a second electronic switch and a first toggle connected to the second electronic switch, the second control switch includes a third electronic switch and a second toggle connected to the third electronic switch, the third control switch includes a fourth electronic switch and a third toggle connected to the fourth electronic switch, two ends of each of the second electronic switch, the third electronic switch, and the fourth electronic switch are electrically connected to the driving power supply and the LED lamp panel, respectively, the second electronic switch has a plurality of states and is configured to control a color temperature of the LED lamp according to different states thereof, the third electronic switch has a plurality of states and is configured to control whether to enable the light-controlled sensor according to different states thereof, the light-controlled sensor is configured to sense a brightness of an external environment and turn on light-emitting elements of LED lamp panel when the brightness of the external environment is lower than a preset value, and the fourth electronic switch has a plurality of states and is configured to control a power of the LED lamp according to different states thereof.

In one of the embodiments, the LED lamp further includes a sealing ring provided between the lamp holder and the LED lamp.

In one of the embodiments, the LED lamp further includes a mounting plate fixed to the lamp holder and configured to fix the LED lamp to a ceiling.

BRIEF DESCRIPTION OF THE DRAWINGS

The drawings are for illustrative purposes only and are only schematic drawings, not physical drawings, and shall not be construed as limiting this patent. In order to better explain the embodiment of the utility model, some parts of the drawings may be omitted, enlarged or reduced, which does not represent the size of the actual product. It will be appreciated by those skilled in the art that some of the known structures and their descriptions in the drawings may be omitted.

DESCRIPTION OF REFERENCE SIGNS

Figure 1:
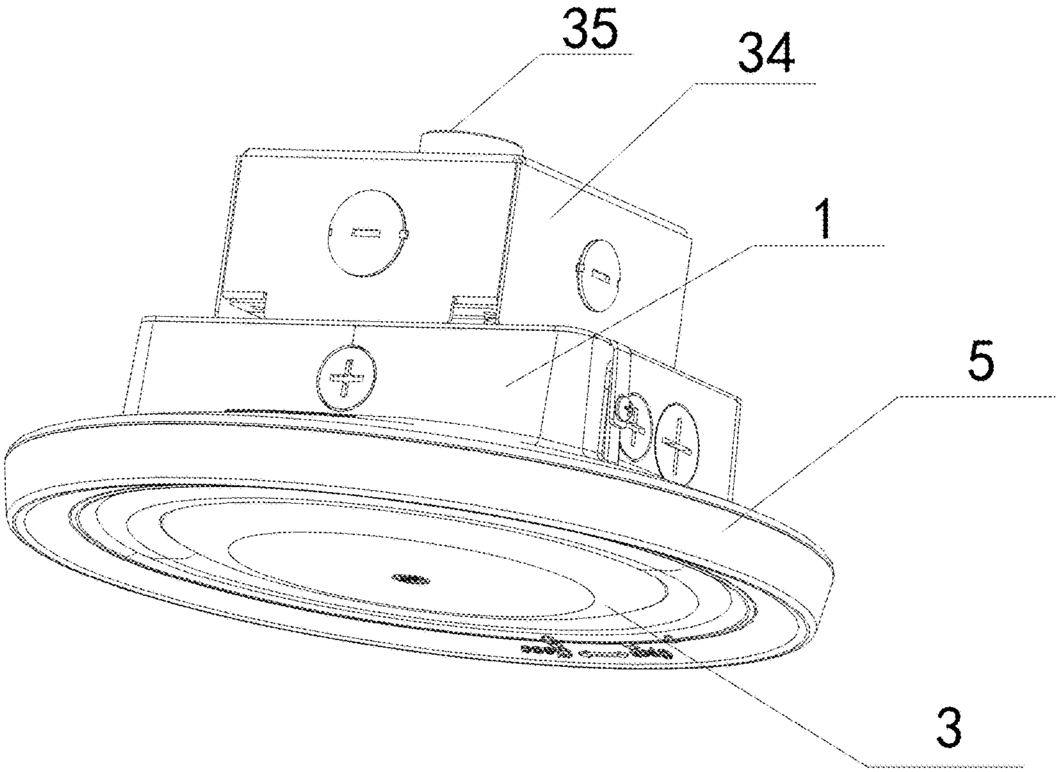
FIG. 1 is a perspective view of an LED lamp according to an embodiment of the present disclosure.

1. Lamp holder; 2. LED lamp panel; 3. Light-transmitting plate; 4. Driving power supply; 5. Pressing frame; 6. Latching block; 7. Fixing base; 8. Latching groove; 9. Positioning block; 10. Positioning groove; 11. Switch assembly; 12. Switch box; 13. First electronic switch; 14. Elastic member; 15. Pressing column; 16. Light-controlled sensor; 17. Controller; 18. Controller box; 19. Base; 20. First control switch; 21. Second control switch; 22. Third control switch 3; 23. Second electronic switch; 24. First toggle; 25. Third electronic switch; 26. Second toggle; 27. Fourth electronic switch; 28. Third toggle; 29. First blocking member; 30. Second blocking member; 31. Sealing ring; 32. Mounting plate; 33. Through hole, 34. Fixing box; 35. O-shaped tube.

DETAILED DESCRIPTION OF THE EMBODIMENTS

The technical solution in the embodiment of the present disclosure will be clearly and completely described below in conjunction with the drawings in the embodiment of the application. Apparently, the described embodiments are only some of the embodiments of the application, not all of them. Based on the embodiments in the present disclosure, all other embodiments obtained by a person skilled in the art without making creative efforts shall all fall within the protection scope of the present disclosure.

In the drawings of the embodiments of the present disclosure, the same or similar numbers correspond to the same or similar components. In the description of the present disclosure, it should be understood that terms “upper”, “lower”, “front” and “rear”, “left”, “right”, “vertical”, “horizontal”, “lateral”, “longitudinal”, “top”, “bottom”, “inner”, “outer”, and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Figure 2:
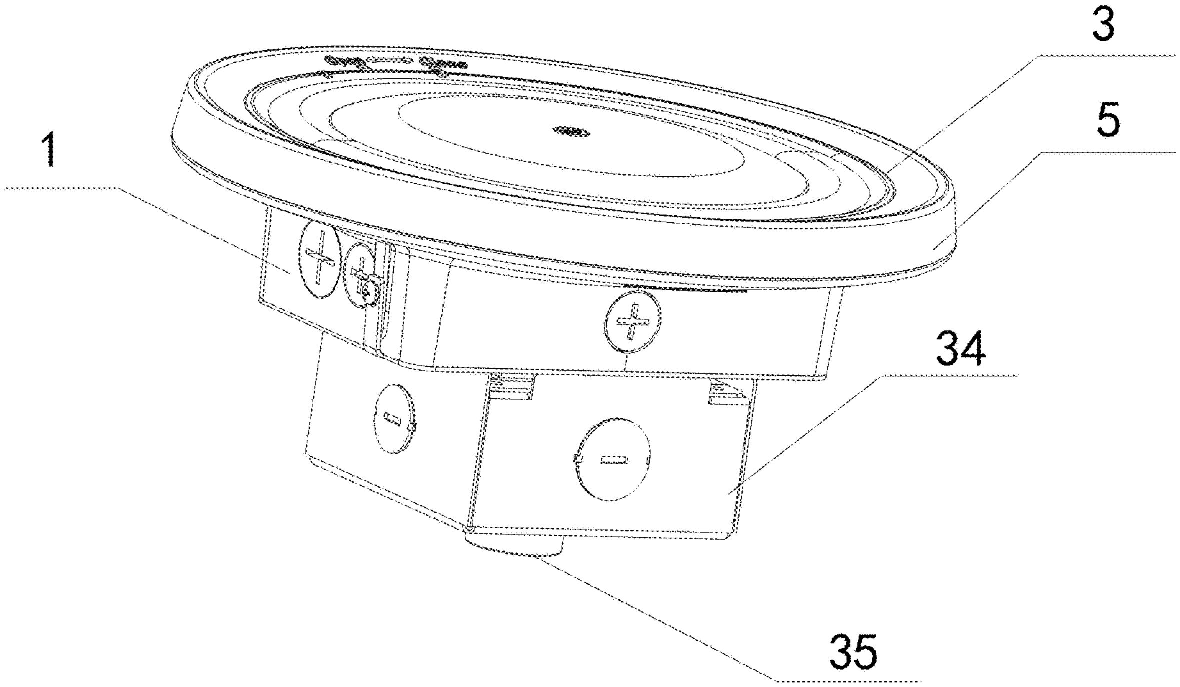
FIG. 2 is similar to FIG. 1, but viewed from another aspect.
Figure 3:
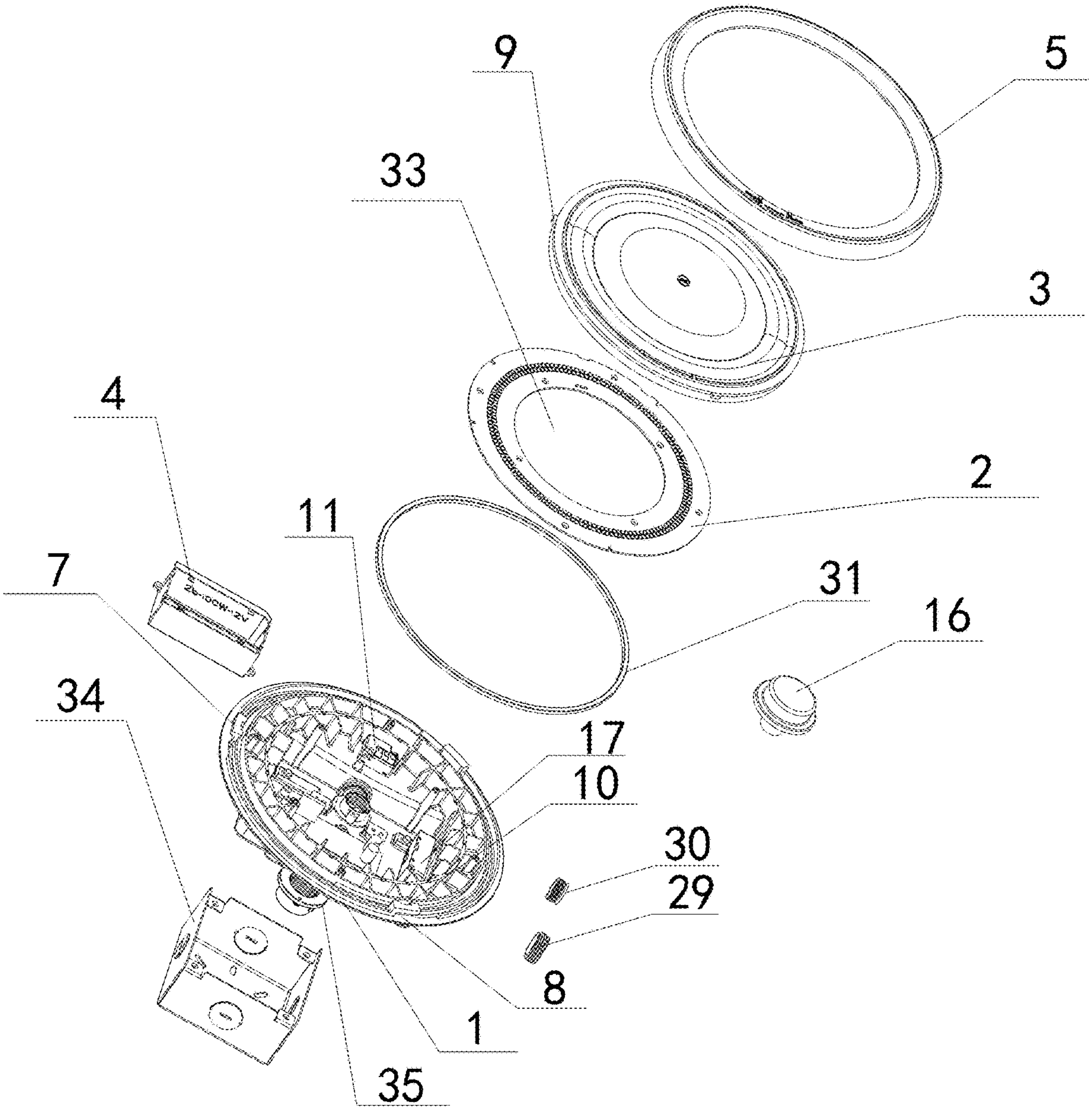
FIG. 3 is a first exploded view of the LED lamp of FIG. 2.

Referring to an embodiment of the present disclosure shown in FIGS. 1 to 3, an LED lamp includes a lamp holder 1, an LED lamp panel 2, a light-transmitting plate 3, and a driving power supply 4. The lamp holder 1 may have a heat dissipation function. The driving power supply 4 and the LED lamp panel 2 are fixed to the lamp holder 1. The driving power supply 4 is electrically connected to the LED lamp panel 2 and configured to supply power to the LED lamp panel 2. The light-transmitting plate 3 covers the LED lamp panel 2. The LED lamp further includes a pressing frame 5 and a quick mounting and dismounting structure. The pressing frame 5 presses the light-transmitting plate 3 and is fixed on the lamp holder 1 through the quick mounting and dismounting structure.

Referring to FIG. 4 to FIG. 7, in an embodiment, the quick mounting and dismounting structure includes a latching block 6 provided on the pressing frame 5 and a fixing base 7 provided on the lamp holder 1. The fixing base 7 is provided with a latching groove 8, and the latching block 6 is engaged in the latching groove 8.

The pressing frame 5 is rotatably connected to the lamp holder 1. When the pressing frame 5 rotates to a first position relative to the lamp holder 1, the latching block 6 is engaged in the latching groove 8. When the pressing frame 5 rotates to a second position relative to the lamp holder 1, the latching block 6 is disengaged from the latching groove 8.

When the light-transmitting-plate 3 needs to be replaced, it is only necessary to manually rotate the pressing frame 5 counterclockwise, so that the latching block 6 on the pressing frame 5 is disengaged from the latching groove 8, and the pressing frame 5 is removed. At this time, the light-transmitting-plate 3 can be removed for replacement or maintenance without tools. On the contrary, when the light-transmitting plate 3 needs to be mounted, the light-transmitting plate 3 is placed in a mounting position, and then the pressing frame 5 is manually covered on the light-transmitting plate 3 and is rotated clockwise. At this time, the latching block 6 on the pressing frame 5 is engaged in the latching groove 8, so that the light-transmitting plate 3 is fixed to the lamp holder 1. The operation is simple and quick, and no other tools are required.

An edge of the light-transmitting plate 3 is provided with a positioning block 9, and the fixing base 7 is provided with a positioning groove 10 corresponding to the positioning block 9. The positioning block 9 is engaged in the positioning groove 10. When mounting the light-transmitting plate 3, the positioning block 9 can be engaged in the positioning groove 10 to pre-mount the light-transmitting plate 3, and then the light-transmitting-plate 3 is pressed by the pressing frame 5. In this way, it is not necessary to fix the light-transmitting-plate 3 by screws as in conventional structures, so that the light-transmitting-plate 3 can be mounted or dismounted quickly and conveniently.

The LED lamp further includes a switch assembly 11 electrically connected between the LED lamp panel 2 and the driving power supply 4. The switch assembly 11 is provided on the lamp holder 1. The light-transmitting plate 3 is located on a side of the LED lamp panel 2 in a light-emitting direction. The light-transmitting plate 3 abuts against the switch assembly 11 when the pressing frame 5 rotates to the first position relative to the lamp holder 1, and the light-transmitting plate 3 is separated from the switch assembly 11 when the pressing frame 5 rotates to the second position relative to the lamp holder 1.

When the light-transmitting plate 3 is separated from the switch assembly 11, the switch assembly 11 cuts off an electrical connection between the LED lamp panel 2 and the driving power supply 4. When the light-transmitting plate 3 abuts against the switch assembly 11, the switch assembly 11 electrically connects the LED lamp panel 2 and the driving power supply 4.

The switch assembly 11 is provided between the LED lamp panel 2 and the driving power supply 4, the light-transmitting-plate 3 is pressed by the pressing frame 5, and the switch assembly 11 is pressed by the light-transmitting plate 3. When the pressing frame 5 is removed due to maintenance or replacement of the light-transmitting plate 3, the pressing frame 5 no longer presses the light-transmitting plate 3, and the light-transmitting plate 3 no longer presses the switch assembly 11, so that a circuit of the switch assembly 11 is disconnected, and the electrical connection between the LED lamp panel 2 and the driving power supply 4 is disconnected, thereby preventing an electric shock caused by a human hand touching the LED lamp panel 2.

Figure 4:
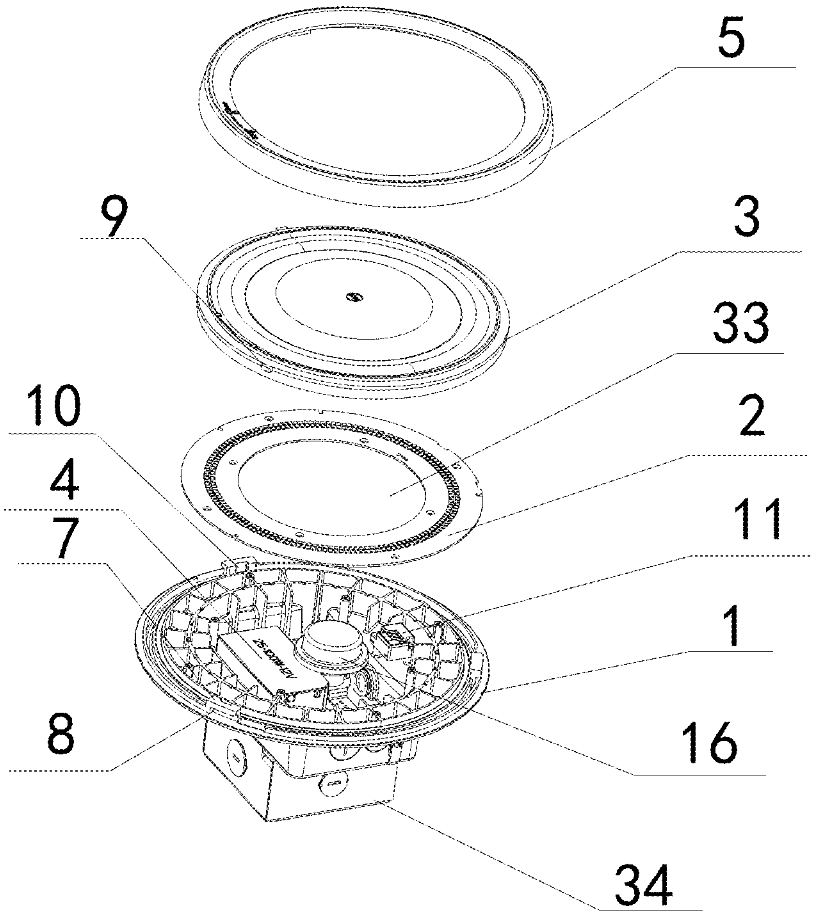
FIG. 4 is a second exploded view of the LED lamp of FIG. 2.
Figure 8:
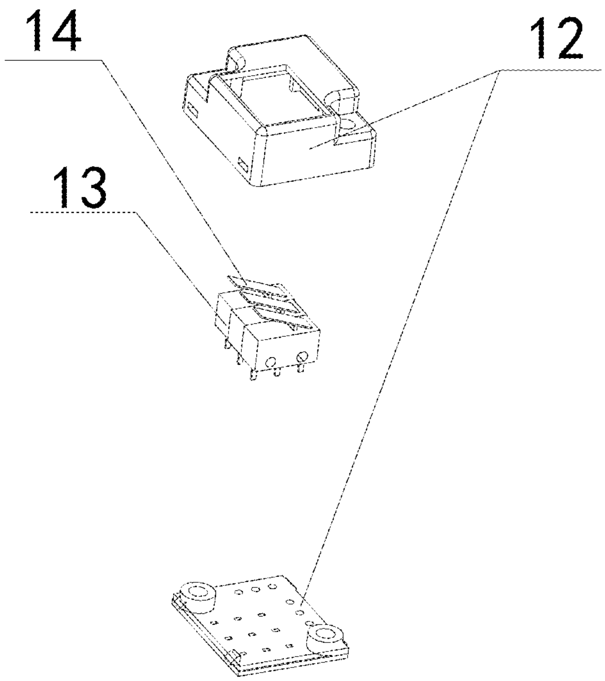
FIG. 8 is an exploded view of a switch assembly according to an embodiment.

Referring to FIG. 4 and FIG. 8, the switch assembly 11 includes a switch box 12, a first electronic switch 13, and an elastic member 14. The first electronic switch 13 is fixed in the switch box 12, and two ends of the first electronic switch 13 are electrically connected to the driving power supply 4 and the LED lamp panel 2, respectively. One side of the elastic member 14 elastically abuts against the light-transmitting plate 3, and the other side of the elastic member 14 faces the first electronic switch 13 and is configured to press a button of the first electronic switch 13. Since one side of the elastic member 14 elastically abuts against the light-transmitting plate 3, when the light-transmitting plate 3 is removed, the light-transmitting plate 3 is separated from the elastic member 14, and the elastic member 14 releases the button of the first electronic switch 13, so that the switch assembly 11 cuts off the electrical connection between the LED lamp panel 2 and the driving power supply 4, thereby avoiding an electric shock caused by a human hand touching the LED lamp panel 2 because the LED lamp panel 2 is not powered off in the conventional structure.

Figure 5:
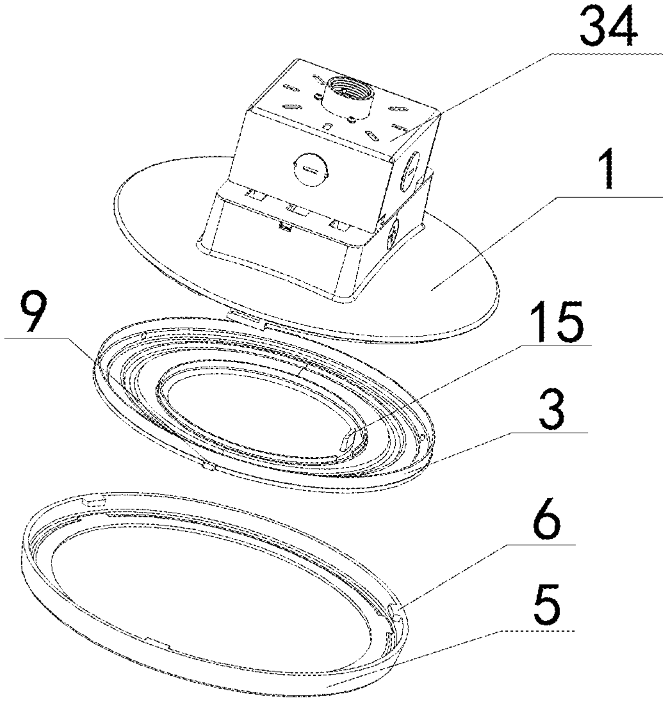
FIG. 5 is a third exploded view of the LED lamp of FIG. 2.
Figure 6:
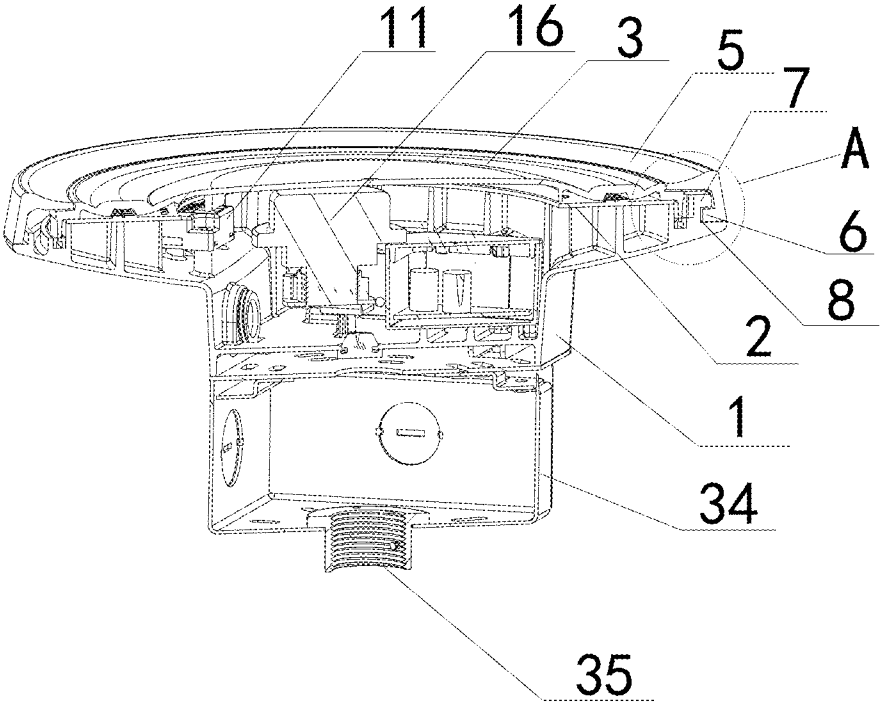
FIG. 6 is a sectional view of the LED lamp of FIG. 2.
Figure 7:
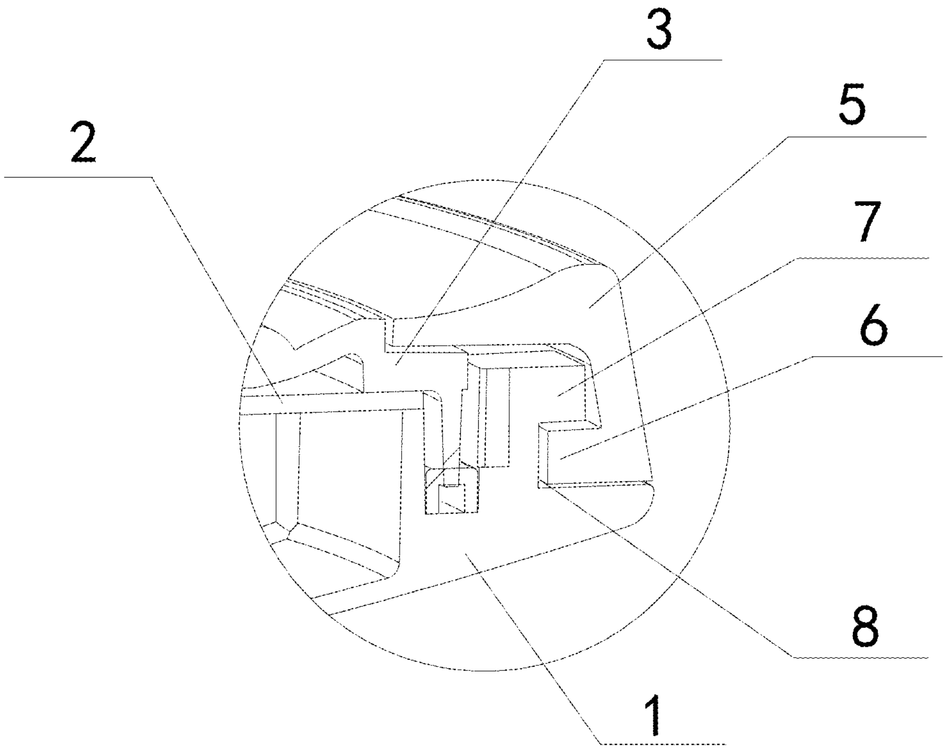
FIG. 7 is an enlarged view of a portion A of FIG. 6.

Referring to FIG. 4 and FIG. 5, the light-transmitting plate 3 is provided with a pressing column 15 corresponding to the elastic member 14. The switch assembly 11 is located on a side of the LED lamp panel 2 away from the light-transmitting plate 3, the LED lamp panel 2 is provided with a through hole 33, and the pressing column 15 extends through the through hole 33 and abuts against the elastic member 14. Such arrangement can make the lamp holder 1 compact in structure, and the switch assembly 11 will not block the LED lamp panel 2, so that a light-emitting area of the LED lamp is larger. In an embodiment, the light-transmitting plate 3 has a lens structure.

Referring to FIGS. 3 to 4 and FIGS. 9 to 11, the LED lamp further includes a light-controlled sensor 16, a controller 17, and a controller box 18. The controller 17 includes a base 19, a first control switch 20, a second control switch 21, and a third control switch 22 that are fixed in the controller box 18. The first control switch 20 includes a second electronic switch 23 and a first toggle 24 connected to the second electronic switch 23. The second control switch 21 includes a third electronic switch 25 and a second toggle 26 connected to the third electronic switch 25. The third control switch 22 includes a fourth electronic switch 27 and a third toggle 28 connected to the fourth electronic switch 27. Two ends of each of the second electronic switch 23, the third electronic switch 25, and the fourth electronic switch 27 are electrically connected to the driving power supply 4 and the LED lamp panel 2, respectively. The second electronic switch 23 has a plurality of states and is configured to control a color temperature of the LED lamp according to different states thereof. The third electronic switch 25 has a plurality of states and is configured to control whether to enable the light-controlled sensor 16 according to different states thereof. The light-controlled sensor 16 is configured to sense a brightness of an external environment and turn on light-emitting elements of LED lamp panel 2 when the brightness of the external environment is lower than a preset value. The fourth electronic switch 27 has a plurality of states and is configured to control a power of the LED lamp according to different states thereof.

Figure 9:
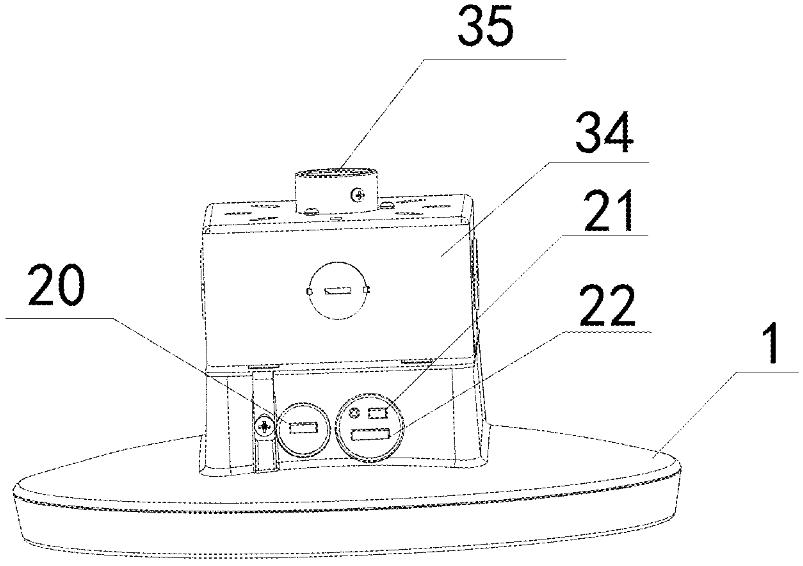
FIG. 9 is an exploded view of a controller according to an embodiment.
Figure 10:
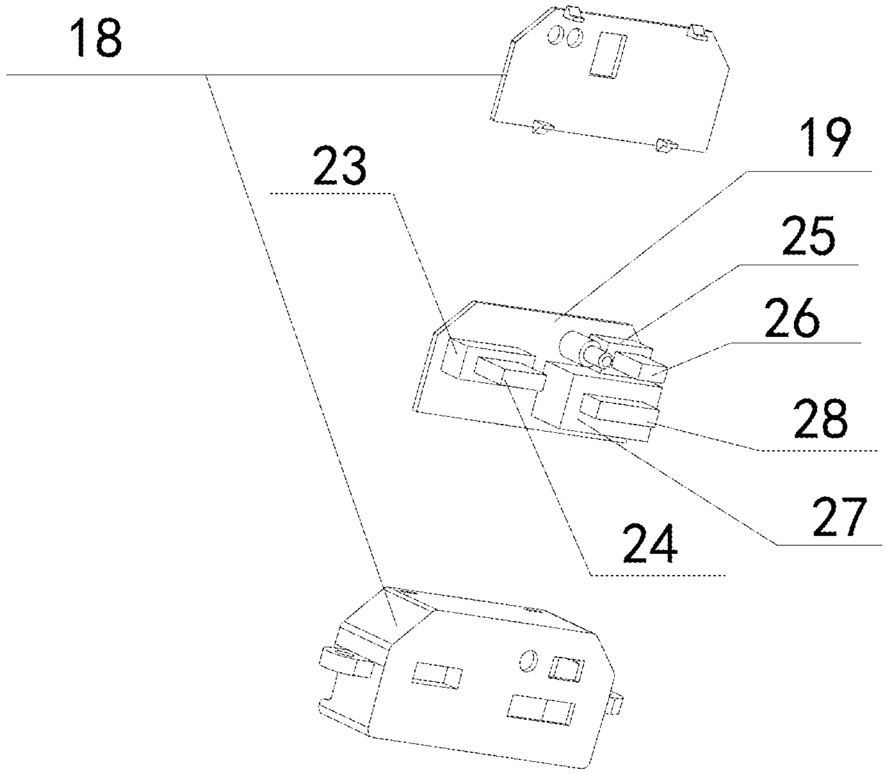
FIG. 10 is another exploded view of the controller of according to an embodiment.
Figure 11:
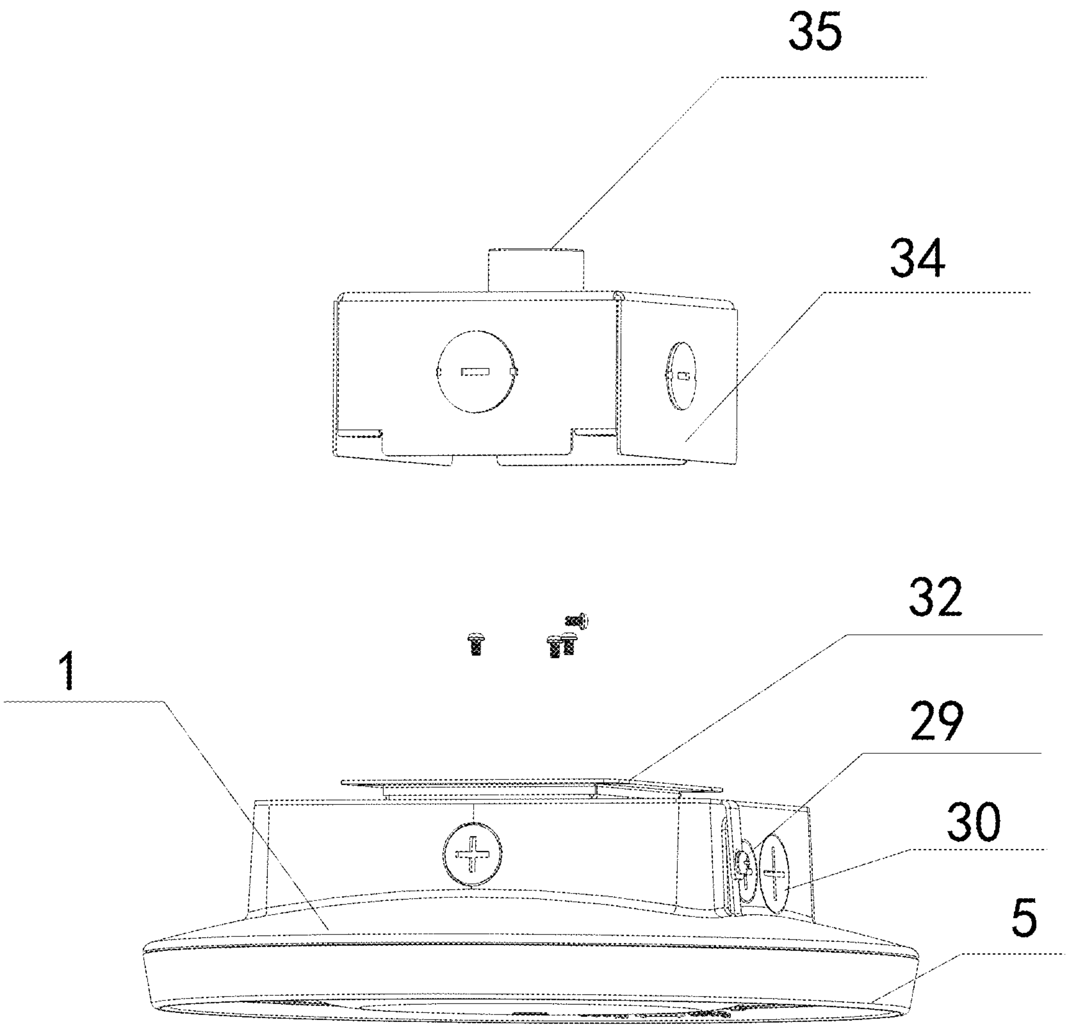
FIG. 11 is yet another exploded view of the controller according to an embodiment.

The controller 17 further includes a first blocking member 29 and a second blocking member 30 that extend through the lamp holder 1 and the controller box 18. The first blocking member 29 is configured to cover the first control switch 20 to protect the first control switch 20. The second blocking member 30 is configured to cover the second control switch 21 and the third control switch 22 to protect the second control switch 21 and the third control switch 22. Specifically, as shown in FIG. 9 to FIG. 11, when the color temperature of the LED lamp needs to be adjusted, the first blocking member 29 is removed from the lamp holder 1, the first toggle 24 of the first control switch 20 is toggled as needed to change the state of the second electronic switch 23, and the second electronic switch 23 controls the color temperature of the LED lamp according to different states thereof to obtain the required color temperature. When it is required to select whether to enable the light-controlled sensor 16, the second blocking member 30 is removed from the lamp holder 1, the second toggle 26 of the second control switch 21 is toggled as needed to change the state of the third electronic switch 25, and the third electronic switch 25 controls whether to enable the light-controlled sensor 16 according to different states thereof. When the power of the LED lamp needs to be adjusted, the second blocking member 30 is removed from the lamp holder 1, the third toggle 28 of the control switch 3 22 is toggled as needed to change the state of the fourth electronic switch 27, and the fourth electronic switch 27 controls the power of the LED lamp according to different states thereof to obtain the required power.

Referring to FIG. 3, the LED lamp further includes a sealing ring 31 provided between the lamp holder 1 and the LED lamp panel 2, so that the LED lamp panel 2 achieves a good waterproof effect.

Referring to FIG. 11, the LED lamp further includes a mounting plate 32 fixed to the lamp holder 1 and configured to directly fix the LED lamp to a ceiling through the mounting plate 32. In another embodiment, the LED lamp may further include a fixing box 34 fixed to the mounting plate 32 and an O-shaped tube 35 fixed to an end of the fixing box 34. The LED lamp is fixed to the ceiling through the O-shaped tube 35, and wires of the driving power supply 4 extend through the mounting plate 32, the driving box 34 and the O-shaped tube 35 to be connected to external wires on the ceiling.

According to the above-mentioned LED lamp, the light-transmitting plate 3 can be quickly and conveniently mounted or dismounted, various light-transmitting plates can be replaced to achieve different lighting effects, and the LED lamp can be applied to various lighting places. In addition, when repairing the LED lamp, there is no risk of electric shock caused by human hands touching the LED lamp panel 2.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:
- a lamp holder;
- an LED lamp panel fixed to the lamp holder;
- a driving power supply fixed to the lamp holder, the driving power supply being electrically connected to the LED lamp panel and configured to supply power to the LED lamp panel;
- a light-transmitting plate covering the LED lamp panel;
- a quick mounting and dismounting structure; and
- a pressing frame pressing the light-transmitting plate and fixed on the lamp holder through the quick mounting and dismounting structure;
- wherein the quick mounting and dismounting structure comprises a latching block provided on the pressing frame and a fixing base provided on the lamp holder, the fixing base is provided with a latching groove, the pressing frame is rotatably connected to the lamp holder, when the pressing frame rotates to a first position relative to the lamp holder, the latching block is engaged in the latching groove, when the pressing frame rotates to a second position relative to the lamp holder, the latching block is disengaged from the latching groove;
- wherein the LED lamp further comprises a switch assembly electrically connected between the LED lamp panel and the driving power supply, wherein the switch assembly is provided on the lamp holder, the light-transmitting plate is located on a side of the LED lamp panel in a light-emitting direction, the light-transmitting plate abuts against the switch assembly when the pressing frame rotates to the first position relative to the lamp holder, and the light-transmitting plate is separated from the switch assembly when the pressing frame rotates to the second position relative to the lamp holder, when the light-transmitting plate is separated from the switch assembly, the switch assembly cuts off an electrical connection between the LED lamp panel and the driving power supply, when the light-transmitting plate abuts against the switch assembly, the switch assembly electrically connects the LED lamp panel and the driving power supply.

2. The LED lamp according to claim 1, wherein the switch assembly comprises a switch box, a first electronic switch, and an elastic member, the first electronic switch is fixed in the switch box, two ends of the first electronic switch are electrically connected to the driving power supply and the LED lamp panel, respectively, one side of the elastic member elastically abuts against the light-transmitting plate, and another side of the elastic member faces the first electronic switch and is configured to press a button of the first electronic switch.

3. The LED lamp according to claim 2, wherein the light-transmitting plate is provided with a pressing column corresponding to the elastic member, the switch assembly is located on a side of the LED lamp panel away from the light-transmitting plate, the LED lamp panel is provided with a through hole, and the pressing column extends through the through hole and abuts against the elastic member.

4. The LED lamp according to claim 1, wherein an edge of the light-transmitting plate is provided with a positioning block, the fixing base is provided with a positioning groove corresponding to the positioning block, and the positioning block is engaged in the positioning groove.

5. The LED lamp according to claim 1, wherein the light-transmitting plate has a lens structure.

6. An LED lamp, comprising:
- a lamp holder;
- an LED lamp panel fixed to the lamp holder;
- a driving power supply fixed to the lamp holder, the driving power supply being electrically connected to the LED lamp panel and configured to supply power to the LED lamp panel;
- a light-transmitting plate covering the LED lamp panel;
- a quick mounting and dismounting structure;
- a pressing frame pressing the light-transmitting plate and fixed on the lamp holder through the quick mounting and dismounting structure; and
- a light-controlled sensor, a controller, and a controller box, wherein the controller comprises a base, a first control switch, a second control switch, and a third control switch that are fixed in the controller box, the first control switch comprises a second electronic switch and a first toggle connected to the second electronic switch, the second control switch comprises a third electronic switch and a second toggle connected to the third electronic switch, the third control switch comprises a fourth electronic switch and a third toggle connected to the fourth electronic switch, two ends of each of the second electronic switch, the third electronic switch, and the fourth electronic switch are electrically connected to the driving power supply and the LED lamp panel, respectively, the second electronic switch has a plurality of states and is configured to control a color temperature of the LED lamp according to different states thereof, the third electronic switch has a plurality of states and is configured to control whether to enable the light-controlled sensor according to different states thereof, the light-controlled sensor is configured to sense a brightness of an external environment and turn on light-emitting elements of the LED lamp panel when the brightness of the external environment is lower than a preset value, and the fourth electronic switch has a plurality of states and is configured to control a power of the LED lamp according to different states thereof.

7. The LED lamp according to claim 1, further comprising a sealing ring provided between the lamp holder and the LED lamp panel.

8. The LED lamp according to claim 1, further comprising a mounting plate fixed to the lamp holder and configured to fix the LED lamp to a ceiling.

* * * * *